(12) United States Patent
Vinson

(10) Patent No.: US 8,064,176 B2
(45) Date of Patent: Nov. 22, 2011

(54) EOS ROBUST BIPOLAR TRANSIENT CLAMP

(75) Inventor: James E. Vinson, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 308 days.

(21) Appl. No.: 11/855,829

(22) Filed: Sep. 14, 2007

(65) Prior Publication Data

US 2008/0247102 A1    Oct. 9, 2008

Related U.S. Application Data

(60) Provisional application No. 60/910,545, filed on Apr. 6, 2007.

(51) Int. Cl.
*H02H 9/00*    (2006.01)
(52) U.S. Cl. .......................... 361/56; 361/91.1; 361/111
(58) Field of Classification Search ................... 361/56, 361/91.1, 111
See application file for complete search history.

(56) References Cited

U.S. PATENT DOCUMENTS

| | | | |
|---|---|---|---|
| 4,249,137 A * | 2/1981 | Malchow ....................... 330/283 |
| 5,541,801 A | 7/1996 | Lee et al. | |
| 5,546,038 A | 8/1996 | Croft | |
| 6,249,410 B1 * | 6/2001 | Ker et al. ........................ 361/56 |
| 6,258,634 B1 | 7/2001 | Wang et al. | |
| 6,365,924 B1 | 4/2002 | Wang et al. | |
| 6,430,016 B1 | 8/2002 | Marr | |
| 6,442,008 B1 * | 8/2002 | Anderson ....................... 361/56 |
| 6,501,632 B1 | 12/2002 | Avery et al. | |
| 6,552,879 B2 | 4/2003 | Voldman | |
| 6,898,061 B1 * | 5/2005 | Kimber et al. .................. 361/56 |
| 6,949,802 B2 | 9/2005 | Shih et al. | |
| 7,196,890 B2 * | 3/2007 | Smith ........................... 361/91.1 |
| 7,589,944 B2 * | 9/2009 | Mergens et al. ................ 361/56 |
| 2002/0074604 A1 | 6/2002 | Wang et al. | |
| 2004/0070999 A1 | 4/2004 | Shearon | |
| 2004/0233595 A1 * | 11/2004 | Ker et al. ........................ 361/56 |
| 2008/0239599 A1 * | 10/2008 | Yizraeli et al. .................. 361/56 |

* cited by examiner

*Primary Examiner* — Rexford Barnie
*Assistant Examiner* — Christopher Clark
(74) *Attorney, Agent, or Firm* — Fogg & Powers LLC

(57) ABSTRACT

A bipolar transient clamp including a RC circuit, a clamping circuit and a breakdown circuit. The RC circuit is configured to control the rate of change of clamp. Moreover, the RC circuit is coupled between a first rail and a second rail. The clamping circuit is configured to pass a current from the first rail to the second rail. In addition, the clamping circuit is coupled to be activated by the RC circuit. The breakdown circuit is coupled between the RC circuit and the clamping circuit. The breakdown circuit is configured to increase the transient trigger voltage of the clamping circuit.

22 Claims, 5 Drawing Sheets

EOS ROBUST BIPOLAR TRANSIENT CLAMP

BACKGROUND

Transient electrostatic discharge (ESD) clamps are very effective with respect to ESD protection because they respond quickly to an ESD event and can clamp well. Moreover, they are easily simulated. Two common types of clamps include a CMOS clamp and a bipolar clamp. In a common CMOS clamp design, an active device is used to keep the main clamping transistor off until needed. In a purely bipolar process used to form a bipolar clamp, there is not an effective element to keep the clamp turned off once power is applied since the clamp has to draw power to keep it turned off. This makes it unattractive from total power consumption standpoint. However, a transient bipolar clamp has its advantage because it can respond to transient voltages of a few volts. In addition, the rise time that a bipolar clamp responds to can be tuned by adjusting the resistance and capacitance of the RC network. An issue with transient bipolar clamps is the switching noise produced by circuit operation. The noise could exceed the transient voltage threshold of the clamp causing the ESD clamps to falsely trigger.

For the reasons stated above and for other reasons stated below which will become apparent to those skilled in the art upon reading and understanding the present specification, there is a need in the art for a transient clamp with a high trigger voltage to prevent noise transients from falsely triggering the clamp while it is powered up and does not consume the added power that a keep off circuit would require.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a bipolar transient clamp is provided. The clamp includes a RC circuit, a clamping circuit and a breakdown circuit. The RC circuit is configured to control the rate of change of clamp. Moreover, the RC circuit is coupled between a first rail and a second rail. The clamping circuit is configured to pass a current from the first rail to the second rail. In addition, the clamping circuit is coupled to be activated by the RC circuit. The breakdown circuit is coupled between the RC circuit and the clamping circuit. The breakdown circuit is configured to increase the transient trigger voltage of the clamping circuit.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention increase the required trigger voltage by placing one or more breakdown elements in series with the trigger path allowing a tunable trigger voltage. A higher trigger voltage prevents noise transients from falsely triggering the clamp while it is powered up and does not consume the added power that a keep off circuit would require. Moreover, higher current capability of the clamp is not reduced by the addition of the breakdown elements.

Figure 1:
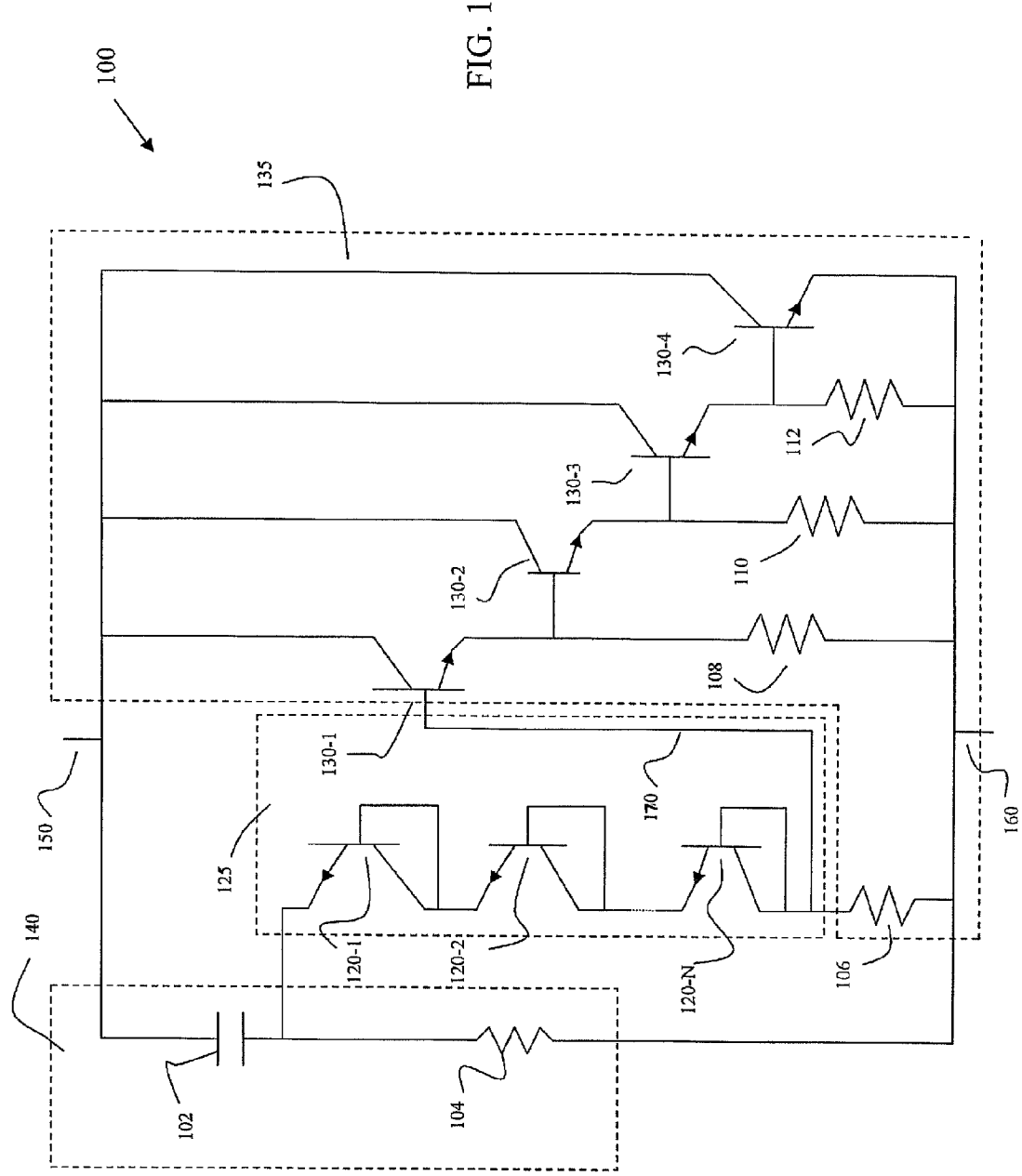
FIG. 1 is schematic diagram of a EOS robust transient clamp of one embodiment of the present invention.

Referring to FIG. 1, a schematic diagram of an EOS robust bipolar clamp 100 of one embodiment is illustrated. As illustrated, the EOS robust bipolar clamp 100 includes RC circuit 140, breakdown circuit 125 and clamping circuit 135. The RC circuit 140 includes a capacitor 102 and resistor 104. Resistor 104 can be referred to as rate resistor 104. The RC circuit 140 controls the rate of change of the clamp 100. That is, adjusting the values of the capacitor 102 and the resistor 104 will effect how fast the clamp 100 reacts to transient voltages on the rails 150 and 160. The clamping circuit 135 includes cascading clamps 130-1 through 130-4 and resistors 106, 108, 110, and 112. In one embodiment the clamping elements 130-1 through 130-4 are transistors such as NPN transistors 130-1 through 130-4. The number of clamping elements can vary depending on the application. Moreover, in this embodiment, a delta voltage change is driven by the junction in the clamping elements 130-1 through 130-4. As illustrated, the clamping elements 130-1 through 130-4 are coupled to pass a current between the first rail 150 and the second rail 160 when their respective base is activated. As further illustrated each clamping resistor 106, 108, 110 and 112 is coupled between a base of an associated transistor 130-1 through 130-4 and the second rail 160. In one embodiment, the value of the clamping resistors 106, 108, 110 and 112 lessen the farther the resistor is away from the breakdown circuit 125. For example, resistor 106 may have value of 10 k Ohms, resistor 108 may have a value of 5 k ohms, resistor 110 mat have value of 2 k ohms and resistor 112 may have a value of 1 k ohms. Clamping resistor 106 can be referred to as first clamp resistor 106 and clamping resistors 108, 110 and 112 can be referred to as mid clamp resistors 108, 110 and 112.

The breakdown circuit 125 includes one or more breakdown elements 120-1 through 120-N. In embodiments, the numbers of breakdown elements 120-1 through 120-N are varied to achieve a desired breakdown voltage. In particular, with the addition or subtraction of the breakdown elements 120-1 through 120-N, the trigger voltage can be tuned to a desired level. Any type of breakdown element can be used that provides a desired voltage drop. The breakdown elements 120-1 through 120-N are connected in series. In the embodiment of FIG. 1, the breakdown elements 120-1 through 120-N are base-emitter breakdown diodes of transistors. Another example of a breakdown element that could be used is a diode. As illustrated, the breakdown elements 120-1 through 120-N are coupled in series with the base of the clamping elements 130-1 through 130-4 via trigger path 170.

In embodiments as described above a transient on the supply or a charge on the plus rail 150 drives the clamping elements 130-1 through 130-4 to be turned on via the trigger path 170. The breakdown elements 120-1 through 120-N raise the voltage needed to turn on the clamping elements 130-1 through 130-4. The base-emitter breakdown diodes of the breakdown elements 120-1 through 120-N in the embodiment of FIG. 1, provide a relatively small stepping voltage. With embodiments of the present transient clamp 100, at regular power supply turn on, the clamp 100 will stay off. Hence, the transient clamp 100 can be used within the supply range. Clamp 100 only responds to fast transients, so clamp 100 will remain off during slow-ramp power up modes. In addition, clamp 100 will only stay on for a period of time defined by the charging time of capacitor 102. Transient clamp 100 is unlike voltage level clamps where the voltage has to get above a certain level before the clamp starts conducting so it cannot be used within supply voltage ranges. Moreover, unlike transient clamp 100, in voltage level clamps additional voltage above that level actually drives the clamp into deeper and deeper conduction.

Figure 2:
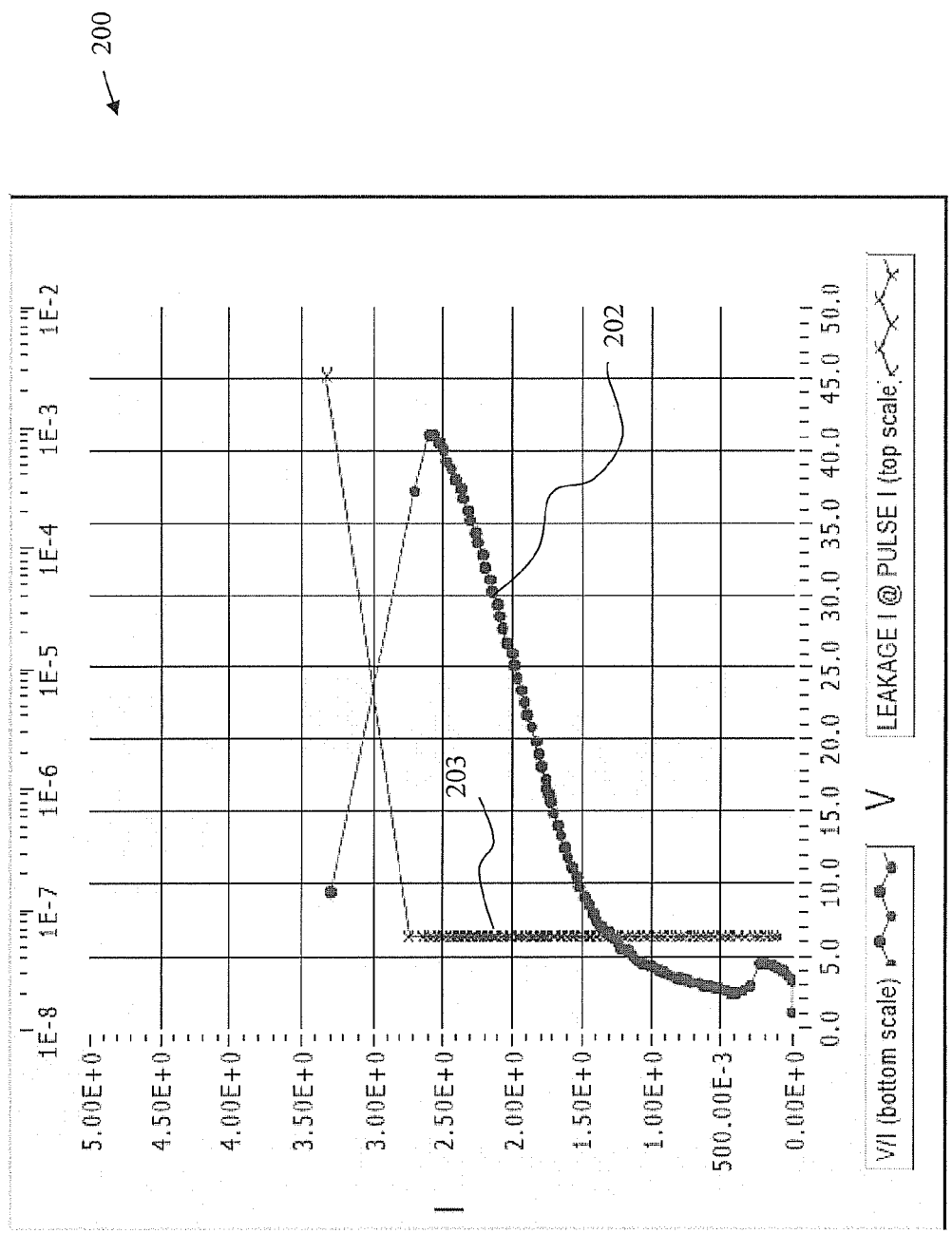
FIG. 2 is a graph of a control clamp TLP curve.

FIG. 2 illustrates a Transmission Line Pulse (TLP) graph 200 that shows the result of a clamp without additional breakdown elements. The units of measure of the TLP graph 200 include voltage in volts along the bottom axis, current in amps along the side axis and current in amps along the top axis. In creating the TLP graph, a rectangle current pulsed is forced into the device and the resulting voltage on the device is measured. The voltage and current is represented by the circles that make up the I/V characteristic curve 202 for the ESD element. The voltage and current are indicated by the voltage scale along the bottom axis and the current scale along the side axis of the graph. After each current pulse, a leakage current measurement is taken to monitor if the device has failed. The current leakage measurement tells how much current is flowing in a normal operation like in power up. The results of the current leakage measurements are indicated by x's on the TPL graph 200 which make a current leakage curve 203. The current scale of the x's on the current leakage curve 203 is indicated on the top axis. Every circle that is representative of the voltage and current measured by the TLP system has an associated x. Hence, every circle, that represents a pulse from the TLP system, has an associated x that defines what the leakage was as a result of the pulse. The I/V characteristic of the prior art shows a turn on voltage of about 3 volts (Curve 202) rising in current and voltage until about 2.7 amps of current. As illustrated in the TLP graph, the leakage current is constant at 5E-8 amps until the current of the pulse get above 2.7 amps. After this point, the main clamping element 130-4 has failed. This current level defines the capability of the transient clamp.

Figure 3:
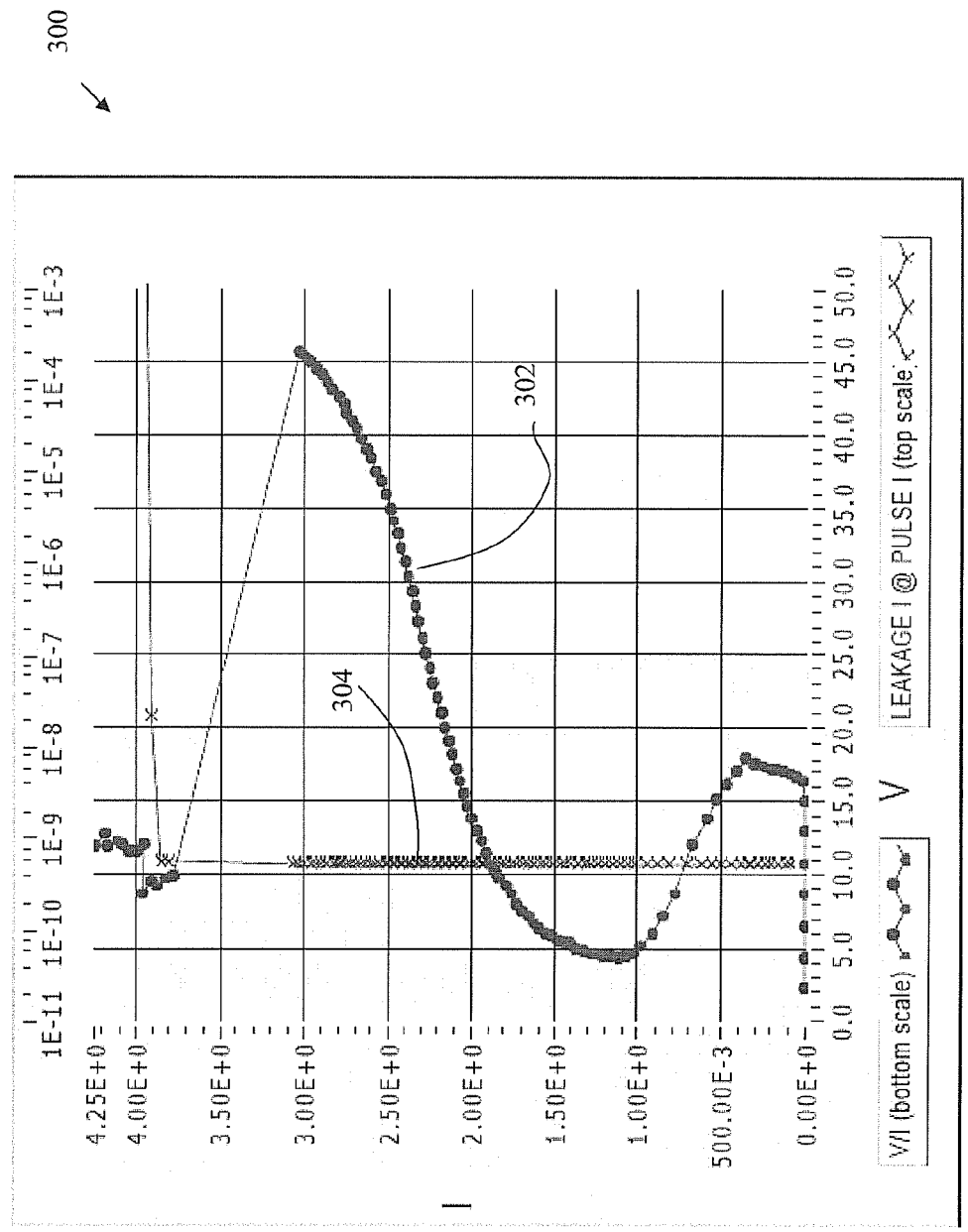
FIG. 3 is a graph of a modified clamp with one diode of one embodiment of the present invention.
Figure 4:
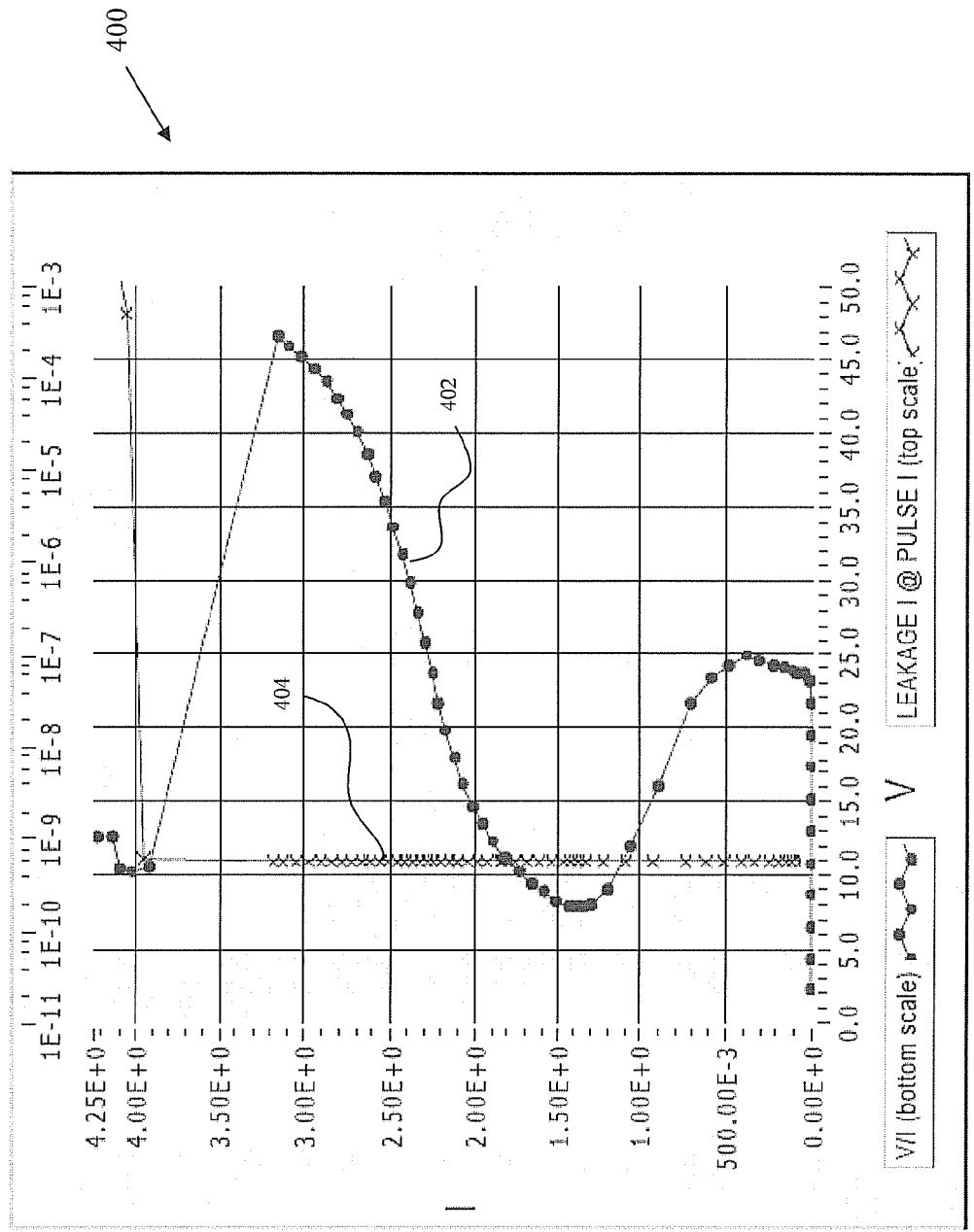
FIG. 4 is a graph of a modified clamp with 2 diodes of one embodiment f the present invention.

FIG. 3 illustrates another TLP graph 300. In this TLP graph 300 one breakdown device is used that is in series with the trigger path 170. As illustrated with the I/V curve 302 and the current leakage curve 304, the introduction of the breakdown device changes when the conduction (curve 302) starts. In particular, conduction starts at 16 volts not 3 volts as shown in 200. Hence the addition of the breakdown element adjusts transient voltage level needed to be applied to the trigger path 170 to activate the clamping circuit 135. FIG. 4 illustrates a further TLP graph 400 that includes two breakdown devices. As illustrated with this graph 400, the I/V curve 402 and the current leakage curve 404 is further changed. In this example, a voltage transient of 23 volts is needed to activate the clamping circuit 135.

Figure 5:
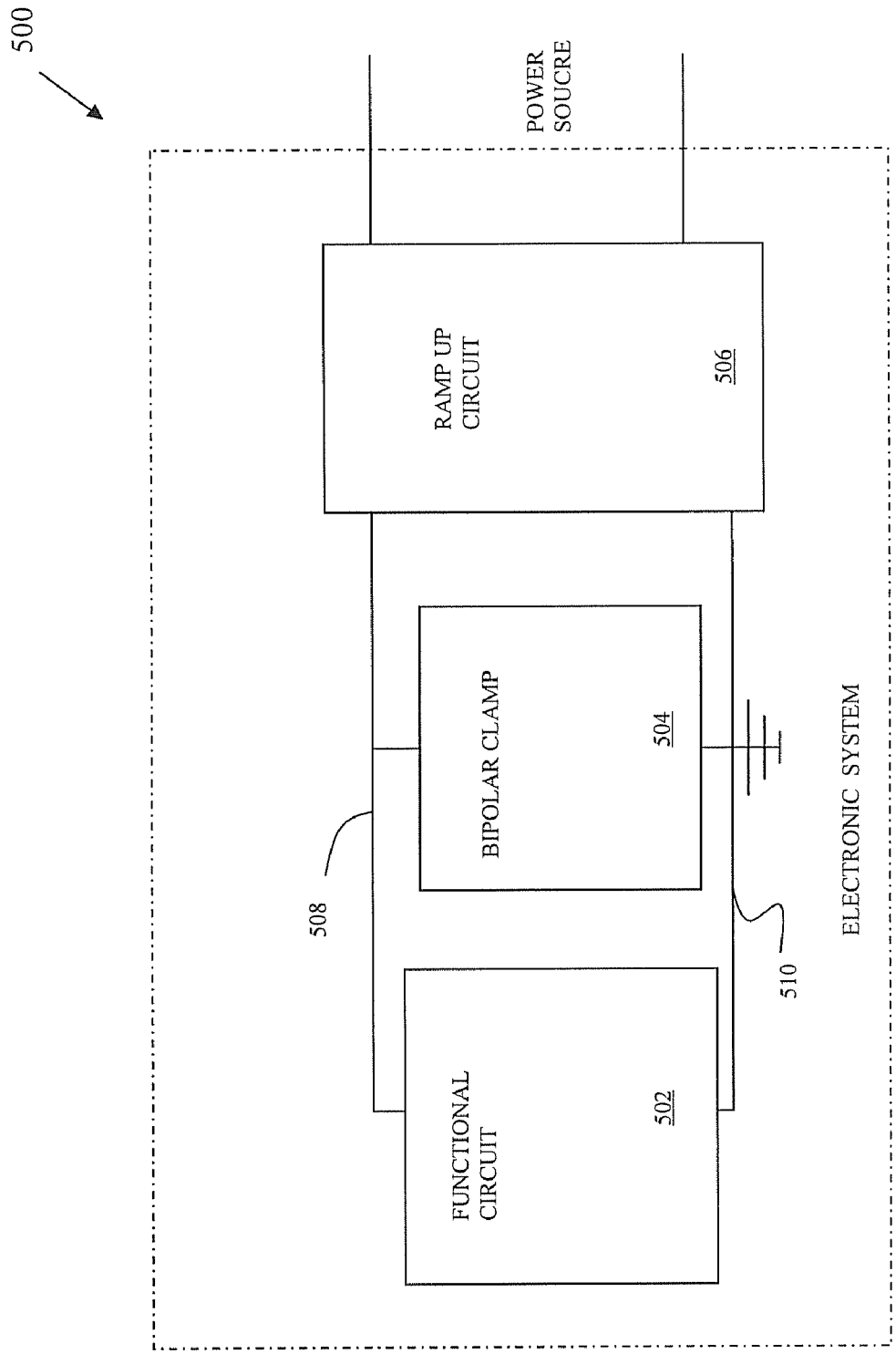
FIG. 5 is a block diagram of a electronic system of one embodiment of the present invention.

Referring to FIG. 5, an electronic system 500 of one embodiment of the present invention is illustrated. The electronic system 500 includes a bipolar clamp 504 such as the bipolar claim 100 of FIG. 1. As FIG. 5 illustrates, a ramp up circuit 506 is coupled to receive a power source that can be either external or internal to the electronic system 500. The ramp up circuit 506 provides a regulated ramp up voltage to the functional circuit 502 on start up of the electronic system 500 via first rail 508 and a second rail 510. The functional circuit 502 can include any type or number of components, such as but not limited to processors, memories, registers, etc., that provide the functions of the electronic system 500. Bipolar clamp 504 only responds to fast transients, so clamp 504 will remain off during slow-ramp power up modes provided by the ramp up circuit 506. In addition, the trigger voltage of the bipolar clamp 504 can be adjusted with a select number of breakdown devices to prevent noise transients from falsely triggering the clamp 504 during power up.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A bipolar transient clamp, the clamp comprising:
    a RC circuit having an output and configured to control the rate of change of the clamp, the RC circuit coupled directly to a first rail and a second rail;
    a clamping circuit configured to pass a current from the first rail to the second rail, the clamping circuit coupled to be activated by the RC circuit as a result of a transient voltage; and
    a breakdown circuit coupled between the RC circuit and the clamping circuit, the breakdown circuit configured to increase a transient trigger voltage of the clamping circuit;
    wherein the output of the RC circuit is coupled only to the breakdown circuit.

2. The clamp of claim 1, wherein the RC circuit further comprises:
    a capacitor having a first side coupled to the first rail; and
    a rate resistor having a first end coupled to a second side of the capacitor, the resistor further having a second end coupled to the second rail.

3. The clamp of claim 2, wherein the breakdown circuit has a first connection coupled to a connection between the second side of the capacitor and the first end of the rate resistor.

4. The clamp of claim 1, wherein the clamping circuit further comprises:
    a plurality of cascading coupled transistors.

5. The clamp of claim 4, wherein the plurality of transistors are NPN transistors.

6. The clamp of claim 4, wherein the plurality of transistors further comprise:
    a first transistor having its base coupled to a trigger path from the at least one breakdown element, the first transistor further having its collector coupled to the first rail; and an end transistor having its collector coupled to the first rail and its emitter coupled to the second rail.

7. The clamp of claim 6, the plurality of cascading transistors further including:
a plurality of mid transistors each having their collectors coupled to the first rail and their bases coupled to an associated emitter of another transistor.

8. The clamp of claim 7, further comprising:
a first clamp resistor coupled between the second rail and a base of the first transistor; and
a plurality of mid clamp resistors, each mid clamp resistor coupled between the second rail and an associated base of a respective mid transistor.

9. The clamp of claim 1, where the breakdown circuit further comprises:
at least one breakdown device having a first side coupled to the RC circuit; and
a trigger path coupled to the at least one breakdown device.

10. The clamp of claim 9, wherein the at least one breakdown device is at least one of a diode and a base-emitter breakdown diode of a transistor.

11. An electronic system comprising:
a functional circuit configured to provide at least some of the functions of the electronic system;
a ramp up circuit configured to provide a regulated ramp up voltage to the functional circuit at start up of the electronic system; and
a bipolar transient clamp coupled between the ramp up circuit and the functional circuit, the clamp including:
a RC circuit having an output and configured to control the rate of change of the clamp, the RC circuit coupled directly to a first rail and a second rail;
a clamping circuit configured to pass a current from the first rail to the second rail, the clamping circuit coupled to be activated by the RC circuit as a result of a transient voltage; and
a breakdown circuit coupled between the RC circuit and the clamping circuit, the breakdown circuit configured to increase a transient trigger voltage of the clamping circuit;
wherein the output of the RC circuit is coupled only to the breakdown circuit.

12. The electronic system of claim 11, wherein the clamping circuit further comprises:
a plurality of cascading coupled transistors.

13. The electronic system of claim 11, where the breakdown circuit further comprises:
at least one breakdown device having a first side coupled to the RC circuit; and
a trigger path coupled to the at least one breakdown device.

14. The electronic system of claim 13, wherein the at least one breakdown device is at least one of a diode and a base-emitter breakdown diode of a transistor.

15. The electronic system of claim 11, wherein the RC circuit further comprises:
a capacitor having a first side coupled to the first rail; and
a rate resistor having a first end coupled to a second side of the capacitor, the resistor further having a second end coupled to the second rail.

16. The electronic system of claim 15, wherein the breakdown circuit has a first connection coupled to a connection between the second side of the capacitor and the first end of the rate resistor.

17. A method of clamping a transient, the method comprising:
providing a bipolar transient clamp comprising:
an RC circuit having an output and coupled directly to a first rail and a second rail;
a clamping circuit configured to pass a current from the first rail to the second rail, the clamping circuit coupled to be activated by the RC circuit; and
a breakdown circuit coupled between the RC circuit and the clamping circuit, the breakdown circuit including a plurality of breakdown deices and configured to increase a transient trigger voltage of the clamping circuit;
wherein the output of the RC circuit is coupled only to the breakdown devices, and a desired breakdown voltage is determined by the number of breakdown devices;
activating the clamping circuit when a transient on a first rail reaches the breakdown voltage; and
ceasing to pass the transient when a capacitor in the RC circuit is fully charged.

18. The method of claim 17, wherein activating the clamping circuit further comprises:
passing the transient to the second rail upon activation of the clamping circuit.

19. The method of claim 18, wherein passing the transient to the second rail upon activation of the clamping circuit further comprises:
passing the transient through cascading coupled transistors.

20. The method of claim 19, further comprising:
passing a breakdown current from the breakdown devices to activate the cascading coupled transistors to pass the transient.

21. A method comprising:
providing a bipolar transient clamp having a tunable trigger voltage that prevents noise transients from falsely triggering the clamp while powered up, the clamp comprising:
an RC circuit having an output and coupled directly to a first rail and a second rail;
a clamping circuit configured to pass a current from the first rail to the second rail, the clamping circuit coupled to be activated by the RC circuit; and
a breakdown circuit coupled to the RC circuit, wherein the output of the RC circuit is coupled only to the breakdown circuit;
activating the clamping circuit when a transient on the first rail reaches the trigger voltage; and
passing the transient to the second rail upon activation of the clamping circuit.

22. The method of claim 21, wherein the bipolar transient clamp comprises one or more breakdown elements in series with a trigger path, wherein a higher number of the breakdown elements allows for a higher trigger voltage.

* * * * *